United States Patent [19]

Ravn

[11] 4,143,807

[45] Mar. 13, 1979

[54] MUSIC ROLL PERFORATING PROCESS AND APPARATUS

[75] Inventor: Mogens Ravn, Santa Monica, Calif.

[73] Assignee: Play-Rite Music Rolls, Inc., Turlock, Calif.

[21] Appl. No.: 878,256

[22] Filed: Feb. 16, 1978

[51] Int. Cl.² .................................................. G06K 1/05
[52] U.S. Cl. ............................................ 234/3; 234/49; 234/58; 234/89; 234/128
[58] Field of Search .......................................... 83/1–3, 83/55, 58, 89, 128, 131, 109–119, 49, 50

[56] References Cited

U.S. PATENT DOCUMENTS

| | | | |
|---|---|---|---|
| 831,818 | 9/1906 | Ball | 234/119 |
| 1,070,480 | 8/1913 | Jefferson | 234/116 |
| 1,162,267 | 11/1915 | Weissmiller | 234/49 |
| 1,303,863 | 5/1919 | Davis | 234/49 |
| 1,494,811 | 5/1924 | Sandell | 234/49 X |
| 1,586,257 | 5/1926 | Mills | 234/1 |
| 3,392,912 | 7/1968 | Von Gunten | 234/89 X |

*Primary Examiner*—J. M. Meister

[57] ABSTRACT

The music roll perforating system permits a paper music roll to be perforated from a special previously prepared magnetic tape containing a digital recording of a music rendition. The process and apparatus disclosed uses a small computer to drive a music roll perforator through a driver box. The driver box accepts a serial data stream from the computer and converts it into parallel channels with high current/high voltage outputs capable of driving the solenoids used in a conventional music roll perforating machine.

A magnetic tape recorder is attached to the computer for the dual purpose of either loading a computer program into the computer following turn-on or for reading the specially prepared digital recording into a computer memory. A Teletype machine is also attached to the computer to permit input to the computer from an operator.

The computer program provides means for reading the digital recording onto the computer memory, reading out the computer memory, calculating the rate of perforation based upon a selected tempo and rate of music roll paper advancement and producing a serial output signal indicative of the musical rendition. The program is read into the computer and may be adjusted from the Teletype machine, which allows selective resetting of the tempo either at the beginning or end of each recorded musical rendition, or a continuation of tempo change with automatic adjustment for buildup of paper on a take-up spool of a player piano.

10 Claims, 3 Drawing Figures

MUSIC ROLL PERFORATING PROCESS AND APPARATUS

This invention relates generally to a method and apparatus for producing perforated paper music rolls with great accuracy and the ability to reproduce the artistic impression and creativity of a pianist. The invention more particularly involves a process and apparatus for recording a digital signal indicative of a particular musical rendition and interfacing the recording and a music roll perforating machine with a computer and perforator driver box. Th computer portion of the apparatus is programmed to read the recorded digital signal, calculate the rate of perforation, select the proper notes and order of notes to be played and then operate the music roll perforating machine through the perforator driver box.

Heretofore, perforated music rolls have been prepared from a precise scoring as indicated on a piece of sheet music. As a consequence, the music roll, when played, produced a rather mechanical sound, lacking in the artistry of any particular musician. It may be noted, however, that in some instances, the master rolls from which copies are made were produced with talent and great labor in an attempt to achieve something more than a mere transcription of mechanical notes. This was accomplished by adjusting the size and locations of the perforations in the paper roll and/or adding other perforations, thereby giving the roll a unique quality and something more than mechanical intonement of the musical composition. Notwithstanding, conventional processes for manufacturing the master roll and its copies have not attained any success in duplicating the musical rendition of a particular artist. It is in that area that the present invention is believed to be of major importance and an advancement in the art of manufacturing a perforated music roll particularly suited for player pianos.

A primary object of the present invention is, therefore, to provide a method and apparatus for manufacturing perforated music rolls which, when played, produce the particular rendition and style of a given artist.

Another object of the invention is to provide a process and apparatus for manufacturing perforated music rolls from magnetic tape recordings, recordings based, not on recorded sounds, but rather on a digital signal that is indicative of the striking of hammers and the position of corresponding keys.

Other objects of this invention will become apparent in view of the following detailed description and the accompanying drawings.

Figure 1:
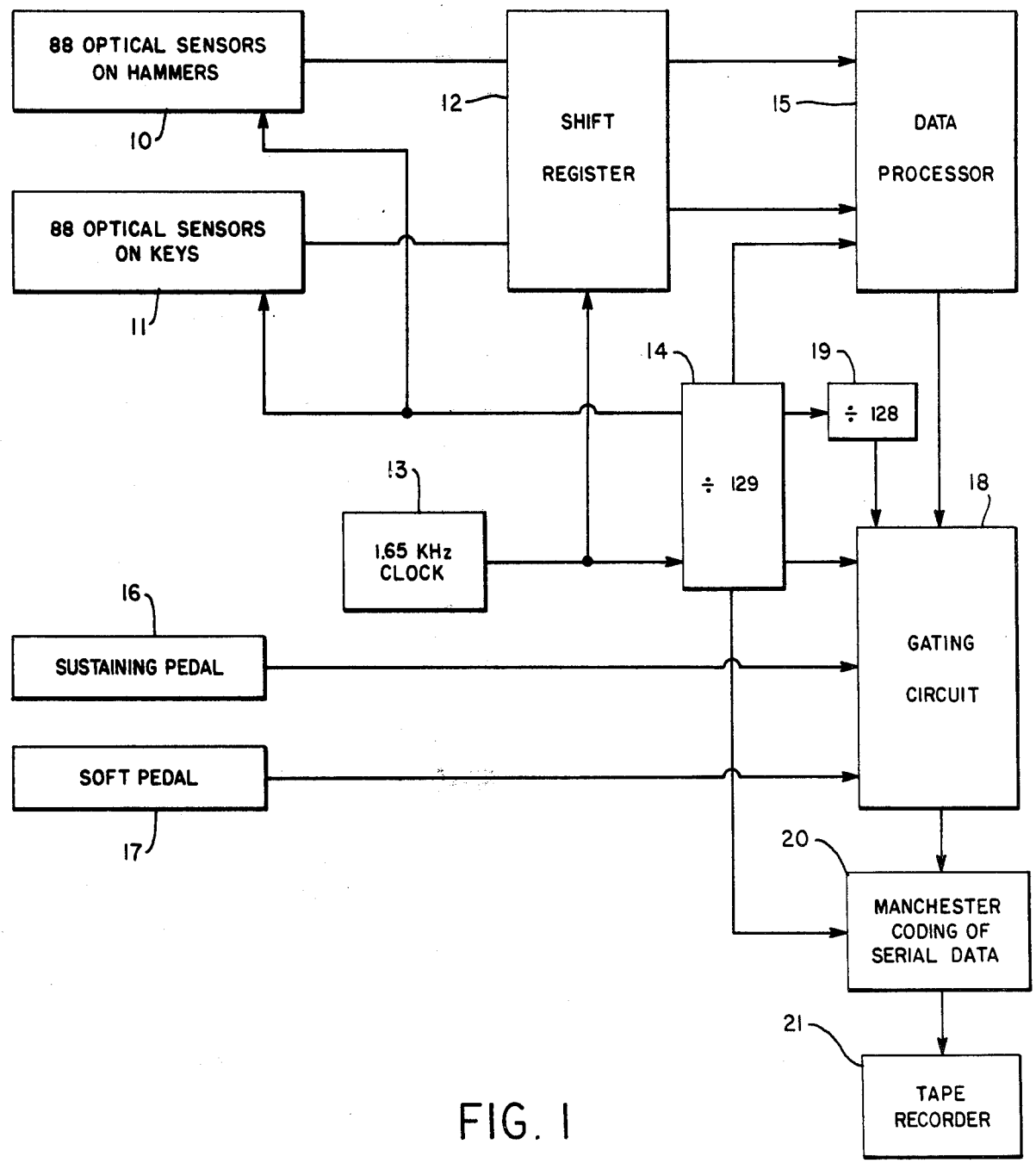
FIG. 1 is a diagrammatic illustration of a preferred recording technique employed in connection with the invention.

Referring to FIG. 1, a preferred embodiment of a recording system for practicing the invention utilizes a plurality of optical sensors for sensing the striking of hammers and the position of corresponding keys on a piano as a pianist plays a musical composition. A released. Thus, set of optical sensors 10 are mounted on the hammers and a second set of optical sensors 11 are mounted under the keys. As each note is played, the associated hammer shutter breaks a beam of infrared light to its optical sensor just before the hammer touches the strings. This indicates the striking of that note. The optical shutters under the keys are so adjusted that they break a beam of infrared light to their associated sensors whenever the keys are depressed about one-third of their travel, or more. The key shutters indicate the instant that the key is released.Thus, a piano having 88 keys or notes capable of being played will require 88 optical sensors for the hammers and an additional 88 optical sensors for the keys. Each optical sensor consists of a light-emitting diode and a phototransistor.

Shift registers 12 are employed to collect and serialize the data that is produced by the optical sensors. The shift registers are loaded at the proper instant by a signal generated by a clock 13 which drives a number of counters, including a counter 14 which triggers the loading of shift registers 12. The hammers and keys are thus scanned once each time counter 14 makes a revolution. A suitable clock-counter arrangement samples each note once every 78.1 $\mu$s.

The two serialized sensor signals are fed to data processing circuitry 15 where they are synchronized with flip-flops, validated with gating circuits, regenerated in other shift registers, slowed down and held in latches, and then multiplexed.

The validation of data emanating from the key sensors is done by comparing two consecutive samples in a NOR gate. A key is considered released if two consecutive samples of the key indicate it is up. Similarly, a hammer is considered to have reached the strings if two consecutive samples indicate that it is or is about to be struck.

Th combined hammer-key signal, a digital signal indicative of the musical rendition played based upon changes in the striking of the hammers and the position of the keys over a period of time, is then serially combined with data as to the position of the sustaining pedal and soft pedal. This data is obtained from two microswitches 16 and 17 which sense the position of the pedals. The hammer-key signal is combined with the pedals data by a gating circuit 18 that is controlled by a counter 19 which divides the original clock signal to a suitable frequency. The binary output of counter 19 corresponds to the bit number of the data to be recorded on tape.

The combined output signal is then Manchester coded by circuitry 20 and recorded on magnetic tape by a conventional recorder 21. Manchester coded data has a transition at the beginning of each bit time and is better characterized in that there is a transition in the middle of each bit time if it is a one, but no transition in the middle if it is a zero. Thus:

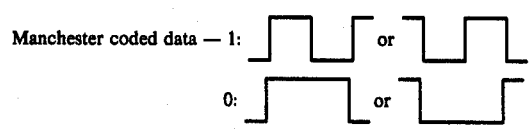

The recording of the musical rendition on magnetic tape, as well as the use of that recording to operate a player piano, is currently known. The importance of that recording system to the present invention lies in the preparation and availability of such digital recordings for use in producing perforated music rolls.

Figures 2, 3:
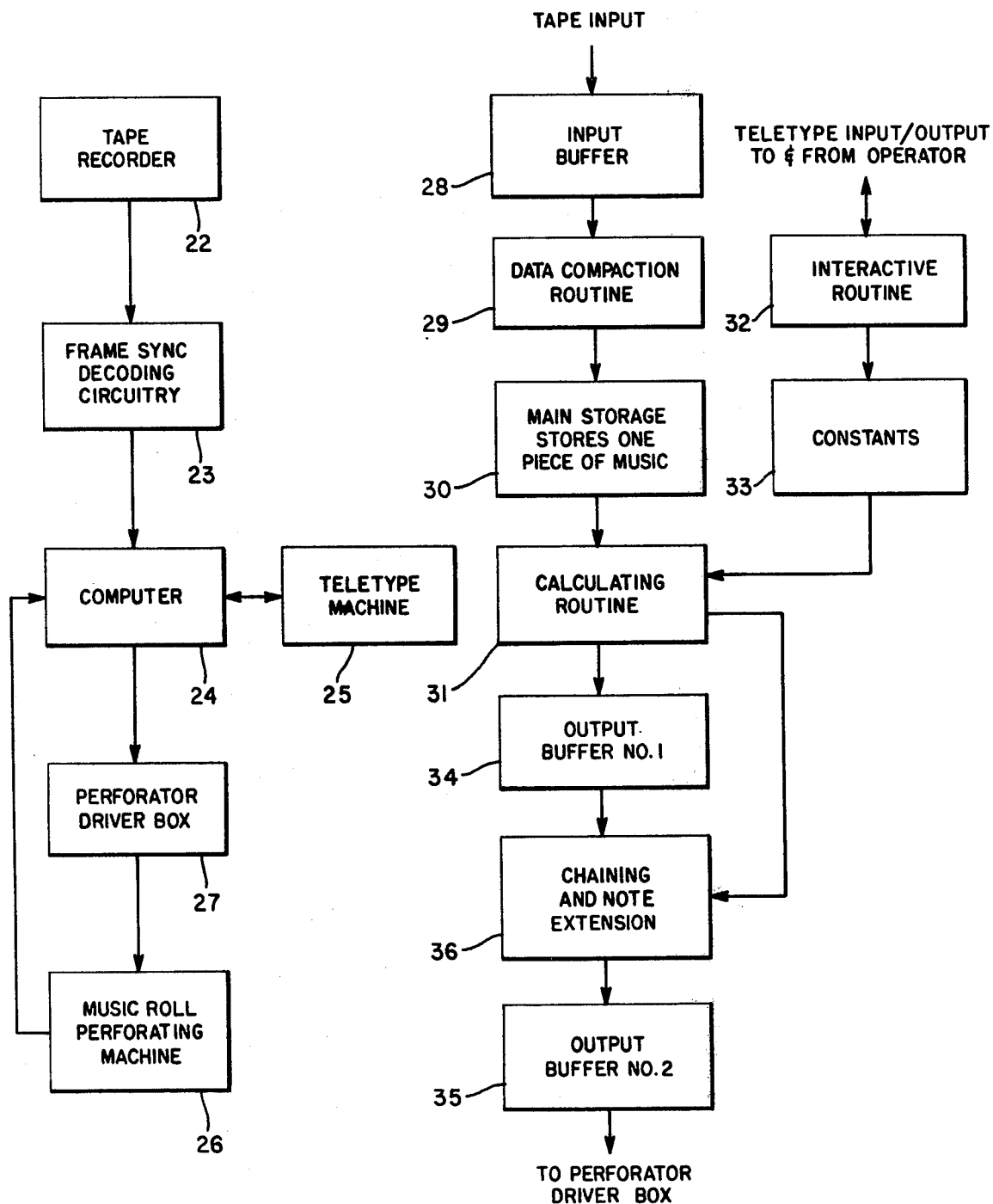
FIG. 2 is a diagrammatic illustration of the perforating system and hardware employed in connection with this invention.
FIG. 3 is a diagrammatic illustration of the computer software used with the invention.

The hardware for using the recorded musical rendition and perforating tape recordings on a music roll is shown in FIG. 2. In brief, the recorded tape signal is played initially on a tape recorder 22, the Manchester coded data is decoded by processing circuits 23 and the output signal is fed to a computer 24 connected to a Teletype machine 25. Computer 24 contains a computer memory capable of storing at least one piece of music, and the computer is programmed to read the digital output signal from circuits 23 onto its memory, calculate the rate of perforation and operate a music roll perforating machine 26 through a perforator driver box 27. The Teletype machine allows an operator to converse with the computer and provides means for programming the rate of perforation based upon the unique characteristics of the piano roll and the perforator machine. The particular functions of the computer as performed by computer software is shown in FIG. 3.

The hardware necessary for practicing the invention is currently available on the open market. One suitable computer apparatus is marketed under the name Servant-8a microcomputer manufactured by Logical Services Incorporated, Mountain View, California. A suitable Teletype machine is the standard model 33ASR set catalogue # 3320/5JE manufactured by the Teletype Corporation.

The Servant-8 contains at least one input/output card using a 9370 universal module. This card contains the necessary circuitry to input one channel of data from the tape recorder and present it to the computer in eight bit bytes. The card is assigned one data port number and one status port number and the computer communicates with this card, using its standard data bus, by addressing the data and status ports.

The Servant-8 also contains a card called an interface card which is also constructed using a 9370 universal module. This card contains circuitry to amplify, filter and shape the input and output signals to and from the input/output cards. The incoming tape recorder data first goes through an automatic gain control and then proceeds through two stages of amplification and filtering.

Th computer software is shown in FIG. 3. First the incoming tape signal is put through an input buffer 28. Next, the information is fed to a data compaction routine 29, reducing the computer memory requirements, and then read onto the computer memory 30 which is capable of storing at least one piece of music.

The calculating routine portion 31 of the computer program converts time to punching steps while introducing tempo compensation and translating note signals to perforator channel assignments. In addition, the calculating routine provides means for shortening or lengthening the perforations made by the perforating machine.

Th computer further contains an interactive routine 32 which allows an operator to specify the operation and verify the program by observation on the Teletype machine. For example, an operator may specify tempo, or the amount of adjustment of tempo, to compensate for the buildup of paper on the take-up spool of the player piano. Computer 24 may also be programmed by reference to a set of constants 33, including tempo, a given paper thickness of the music roll, given take-up spool circumference, the number of punching steps per inch of paper travel and the desired chaining pattern. A preferred computer program includes means for resetting the tempo at the end of each recorded musical composition or selectively and alternatively continuing the tempo with automatic adjustment for further buildup of paper on the take-up spool. Thus, several musical compositions may be recorded by perforations on a single music roll with continuing and automatic adjustment for paper buildup.

In a preferred embodiment of the invention, constants 33 provide means for perforating an 88 note piano roll at a tempo of 80 but having means for selectively changing the tempo through the Teletype machine.

A preferred computer program includes means for recording the digital signal indicative of the position of the sustaining and soft pedals in relation to the recorded musical rendition. As shown in FIG. 1, this information may be serialized with the sensor data from the hammers and keys, recorded on magnetic tape, and fed to the computer memory as a part of the tape input signal to the computer. The calculating routine would then include means for reading the memory and extending the note perforations which are on while the sustaining pedal is held down. Such a program extends the note perforations either until the sustaining pedal is released or until the note is struck again.

A pair of output buffers 34 and 35 isolate the chaining and note extension function 36 from the rest of the calculating routine.

Perforator driver box 27 serves primarily to interface the computer with a standard or conventional music roll perforating machine. The box accepts a serial input signal from the computer and drives a plurality of high voltage/high current outputs for operating the solenoids or chest magnets of the music roll perforating machine 26.

Although a preferred embodiment of the invention has been illustrated and described, various modifications and changes may be resorted to without departing from the spirit of the invention or the scope of the appended claims, and each of such modifications and changes is contemplated.

What is claimed is:

1. A process for producing perforated tape recordings of a piano type musical instrument having key actuated hammers producing note sounds, comprising the steps:
   sensing the striking of hammers and the position of corresponding keys while producing digital output signals indicative of the striking and/or position of each;
   serially gating the digital output signals and producing a second digital signal indicative of the musical rendition played based upon changes in the striking of the hammers and the position of the keys over a period of time;
   recording the second digital output signal; and
   interfacing said recording and music roll perforating machine with a computer and perforator driver box, said computer being programmed to read the recorded second output signal, calculate the rate of perforation and operate the music roll perforating machine through said perforator driver box.

2. Apparatus for producing perforated paper recordings on a music roll perforating machine of a musical rendition from a digital recording on magnetic tape comprising:
   computer means including a program for reading the digital recording onto a computer memory, reading out the computer memory, calculating the rate of perforation based upon a selected tempo and rate of paper advancement and producing a serial output signal indicative of the musical rendition; and means for interfacing said computer means with a music roll perforating machine, said means accepting the serial output signal from the computer means and having high voltage/high current outputs for operating a conventional music roll perforating machine.

3. The apparatus of claim 2, and further including a Teletype machine connected to said computer means for programming and communicating with said computer program.

4. The apparatus of claim 2, said computer means further including means for controlling and adjusting the tempo for buildup of paper on a take-up spool of a player piano.

5. The apparatus of claim 2, said computer means including means for alternately and selectively resetting the tempo at the end of each recorded musical composition or continuing the tempo with automatic adjustment for further buildup of paper on a take-up spool of a player piano.

6. Th apparatus of claim 2, said computer means including a memory for recording a digital signal indicative of the position of a sustaining pedal in relation to the recorded musical rendition, means for reading said memory and introducing an extension of notes characteristic of a hammer that is repeatedly struck, whereby notes that are read from the computer while the sustaining pedal is down are held on until the sustaining pedal is released or until the note is struck again.

7. The apparatus of claim 2, said computer means being programmed for perforating an 88 note piano roll at a tempo of 80 and having means for selectively changing the tempo.

8. The apparatus of claim 2, said computer means being programmed for perforating an 88 note piano roll for given thicknesses of music roll paper and having means for selectively changing the rate of perforation in relation to selected thicknesses of music roll paper.

9. Apparatus for producing perforated paper recordings of a piano type musical instrument having key actuated hammers producing note sounds, comprising:

means for sensing the striking of hammers and the position of corresponding keys and producing digital output signals indicative of the striking and/or position of each;

means for serially gating the digital output signals and producing a second digital signal indicative of the musical rendition played based upon changes in the striking of the hammers and the position of the keys over a period of time;

means for recording the second digital signal onto magnetic tape;

computer means including a program for reading the digital recording onto a computer memory, reading out the computer memory, calculating the rate of perforation based upon a selected tempo and rate of paper advancement and producing a serial output signal indicative of the musical rendition; and means for interfacing said computer means with a music roll perforating machine, said means accepting the serial output signal from the computer means and having high voltage/high current outputs for operating a conventional music roll perforating machine.

10. The apparatus of claim 9, and further including a Teletype machine connected to said computer means for programming and communicating with said computer program.

* * * * *

UNITED STATES PATENT OFFICE
CERTIFICATE OF CORRECTION

Patent No. 4,143,807    Dated March 13, 1979

Inventor(s) Mogens Ravn

It is certified that error appears in the above-identified patent and that said Letters Patent are hereby corrected as shown below:

Column 1, line 13, "Th" should be The.

Column 1, line 66, "A released. Thus," should be A first.

Column 2, line 36, "Th" should be The.

Column 3, line 22, "8a" should be 8, a.

Column 3, line 43, "Th" should be The.

Column 5, line 24, "Th" should be The.

Signed and Sealed this

Twenty-second Day of May 1979

[SEAL]

Attest:

RUTH C. MASON
Attesting Officer

DONALD W. BANNER
Commissioner of Patents and Trademarks